(12) United States Patent
Askan et al.

(10) Patent No.: US 10,930,458 B2
(45) Date of Patent: Feb. 23, 2021

(54) LOW-VOLTAGE CIRCUIT BREAKER

(71) Applicant: Eaton Intelligent Power Limited, Dublin (IE)

(72) Inventors: Kenan Askan, Vienna (AT); Michael Bartonek, Vienna (AT); Matthias Katzensteiner, Vienna (AT)

(73) Assignee: EATON INTELLIGENT POWER LIMITED, Dublin (IE)

( * ) Notice: Subject to any disclaimer, the term of this patent is extended or adjusted under 35 U.S.C. 154(b) by 151 days.

(21) Appl. No.: 16/331,530

(22) PCT Filed: Sep. 8, 2017

(86) PCT No.: PCT/EP2017/072667
§ 371 (c)(1),
(2) Date: Apr. 30, 2019

(87) PCT Pub. No.: WO2018/046707
PCT Pub. Date: Mar. 15, 2018

(65) Prior Publication Data
US 2019/0252143 A1   Aug. 15, 2019

(30) Foreign Application Priority Data

Sep. 9, 2016 (DE) ..................... 10 2016 117 003.8

(51) Int. Cl.
*H01H 47/32* (2006.01)
*H01H 9/54* (2006.01)
(Continued)

(52) U.S. Cl.
CPC ............ *H01H 47/32* (2013.01); *H01H 9/542* (2013.01); *H02H 7/222* (2013.01); *H01H 9/548* (2013.01);
(Continued)

(58) Field of Classification Search
CPC ........ H01H 47/32; H01H 9/542; H01H 9/548; H01H 9/56; H01H 2009/543; H01H 2009/544; H02H 7/222
See application file for complete search history.

(56) References Cited

U.S. PATENT DOCUMENTS 5,170,310 A * 12/1992 Studtmann ............... H02H 1/04
361/65
5,291,109 A   3/1994 Peter
(Continued)

FOREIGN PATENT DOCUMENTS

DE          4018713 A1    12/1991
JP        H 0578146 U    10/1993
WO   WO 2015028634 A1     3/2015

*Primary Examiner* — Yusef A Ahmed
(74) *Attorney, Agent, or Firm* — Leydig, Voit & Mayer, Ltd.

(57) ABSTRACT

A low-voltage circuit breaker includes: at least one external conductor section from an external conductor power terminal of the low-voltage circuit breaker to an external conductor load terminal of the low-voltage circuit breaker; a neutral conductor section from a neutral conductor terminal of the low-voltage circuit breaker to a neutral conductor load terminal of the low-voltage circuit breaker; a mechanical bypass switch arranged in the external conductor section; a semiconductor circuit arrangement switched in parallel to the bypass switch; an electronic control unit; and a first current measuring arrangement arranged in the external conductor section, the first current measuring arrangement including a first shunt, which is connected to the electronic control unit. The electronic control unit actuates the mechanical bypass switch and the semiconductor circuit arrangement upon detecting a prespecifiable overcurrent that includes a short circuit current, by the current measuring arrangement.

10 Claims, 3 Drawing Sheets

(51) Int. Cl.
*H02H 7/22* (2006.01)
*H01H 9/56* (2006.01)

(52) U.S. Cl.
CPC ......... *H01H 9/56* (2013.01); *H01H 2009/543* (2013.01); *H01H 2009/544* (2013.01)

(56) References Cited

U.S. PATENT DOCUMENTS

| | | | | |
|---|---|---|---|---|
| 6,373,705 | B1* | 4/2002 | Koelle | H01L 23/645 361/720 |
| 7,595,614 | B2* | 9/2009 | Stich | H01H 9/0005 323/256 |
| 2002/0036430 | A1* | 3/2002 | Welches | F02G 1/043 307/18 |
| 2011/0317321 | A1* | 12/2011 | Vogel | H02H 3/025 361/87 |
| 2013/0021708 | A1* | 1/2013 | Demetriades | H02H 3/023 361/102 |
| 2013/0154774 | A1* | 6/2013 | Bhavaraju | H01H 47/32 335/127 |
| 2014/0327458 | A1* | 11/2014 | Gruber | G01R 27/14 324/713 |
| 2014/0346891 | A1* | 11/2014 | Kang | H01H 33/596 307/113 |
| 2015/0091551 | A1* | 4/2015 | Kanschat | H01C 17/00 324/126 |
| 2015/0187689 | A1* | 7/2015 | Nashida | H01L 23/49575 257/774 |
| 2015/0280421 | A1* | 10/2015 | Niwa | H02H 5/10 361/91.1 |
| 2016/0014916 | A1* | 1/2016 | Ausserlechner | H05K 5/0065 361/699 |
| 2016/0190791 | A1* | 6/2016 | Sim | H02H 3/087 361/93.6 |
| 2016/0203932 | A1* | 7/2016 | Niehoff | H01H 47/32 361/170 |
| 2016/0301200 | A1* | 10/2016 | Niehoff | H02H 3/08 |
| 2016/0314928 | A1* | 10/2016 | Niehoff | H01H 83/04 |
| 2017/0004948 | A1* | 1/2017 | Leyh | H01H 9/548 |
| 2017/0236676 | A1* | 8/2017 | Bartonek | H02J 13/00036 361/115 |
| 2017/0271298 | A1* | 9/2017 | Heinrich | H01L 23/051 |
| 2017/0288395 | A1* | 10/2017 | Sim | H01H 33/59 |
| 2018/0033570 | A1* | 2/2018 | Mori | H01H 9/56 |
| 2018/0102303 | A1* | 4/2018 | Mori | B32B 18/00 |
| 2018/0205262 | A1* | 7/2018 | Akita | H02H 3/08 |
| 2020/0194195 | A1* | 6/2020 | Askan | H01H 9/542 |

* cited by examiner

LOW-VOLTAGE CIRCUIT BREAKER

CROSS-REFERENCE TO PRIOR APPLICATIONS

This application is a U.S. National Phase application under 35 U.S.C. § 371 of International Application No. PCT/EP2017/072667, filed on Sep. 8, 2017, and claims benefit to German Patent Application No. DE 10 2016 117 003.8, filed on Sep. 9, 2016. The International Application was published in German on Mar. 15, 2018 as WO 2018/046707 under PCT Article 21(2).

FIELD

The invention relates to a low-voltage circuit breaker.

BACKGROUND

A corresponding circuit breaker is known from WO 2015/028634 held by the applicant. When the circuit breaker is disabled, such as when a short circuit occurs, a bypass switch is thereby first opened, which creates an electric arc, and as a result the current commutates to the semiconductor circuit arrangement. Subsequently, the short circuit current is turned off by the IGBTs (insulated-gate bipolar transistors). It is thereby important that prior to deactivation using the IGBTs, the bypass switch is opened sufficiently wide to avoid an electric arc from reigniting or persisting at the contacts of the bypass switch.

In the known circuit breaker, the collector-emitter voltage is measured at least one of the IGBTs to determine in this way whether the contacts of the bypass switch have started to open. As soon as this is detected by an increase in the collector-emitter voltage, a counter is initiated. After a specified amount of time has elapsed, it is assumed that the contacts of the bypass switch have opened, that they have a sufficient contact clearance, and that the short circuit can be reliably turned off by means of the IGBTs.

However, it has been shown that a few hundred microseconds go by between the detection of a short circuit and the moment at which the contacts of the bypass switch begin to open. However, in the interaction with the rapidly increasing short circuit current, this time is sufficient to result in a sufficiently high current flow in the IGBT parallel branch such that the control electronics detect an opening of the bypass switch contacts, initiate the counter and accordingly turn off the short circuit too early. This results in a damaging electric arc on the bypass switch, by means of which it is subjected to substantial loads. In addition, even when the arrangement in question functions properly or as intended, the long wait prior to turning off the short circuit results in a high load on the IGBT parallel branch as well as the also present varistor, since it must be able to dissipate a correspondingly high voltage.

SUMMARY

In an embodiment, the present invention provides a low-voltage circuit breaker, comprising: at least one external conductor section from an external conductor power terminal of the low-voltage circuit breaker to an external conductor load terminal of the low-voltage circuit breaker; a neutral conductor section from a neutral conductor terminal of the low-voltage circuit breaker to a neutral conductor load terminal of the low-voltage circuit breaker; a mechanical bypass switch arranged in the external conductor section; and an electronic control unit, wherein a semiconductor circuit arrangement of the low-voltage circuit breaker is switched in parallel to the bypass switch, wherein a first current measuring arrangement is arranged in the external conductor section, the first current measuring arrangement comprising a first shunt, which is connected to the electronic control unit, wherein the electronic control unit is configured to actuate the mechanical bypass switch and the semiconductor circuit arrangement upon detecting a prespecifiable overcurrent comprising a short circuit current, by the current measuring arrangement, and wherein the low-voltage circuit breaker has at least a second current measuring arrangement configured to measure a first current across the mechanical bypass switch or a second current across the semiconductor circuit arrangement.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a circuit breaker of the type mentioned earlier, with which the mentioned disadvantages can be avoided, which has a small size, and which is highly reliable over a long period.

In this way, one can reliably detect that the contacts of the bypass switch actually open. After it has been detected in this way that the contacts of the bypass switch actually open, a counter can be initiated, after whose process one can assume that the contacts in question are now completely or sufficiently open. Since it is now ensured that the opening of the contacts in question is in fact detected, the subsequently started counter can be set to a shorter time than has been the case to date. By means of the present measures, one can reliably detect that the contacts of the bypass switch have actually begun to open. In this way, a re-igniting of the electric arc can be avoided here. As a result, the short circuit can be deactivated in a shorter amount of time, by means of which in turn the load on the IGBTs and the varistor can be kept low. In this way, components can be used in respective cases, which have a lower load capacity as well as a smaller size. Due to the smaller size, the loop inductance is also decreased, by means of which the time can be decreased that the short circuit current requires to commutate to the IGBT parallel branch.

Figure 2:
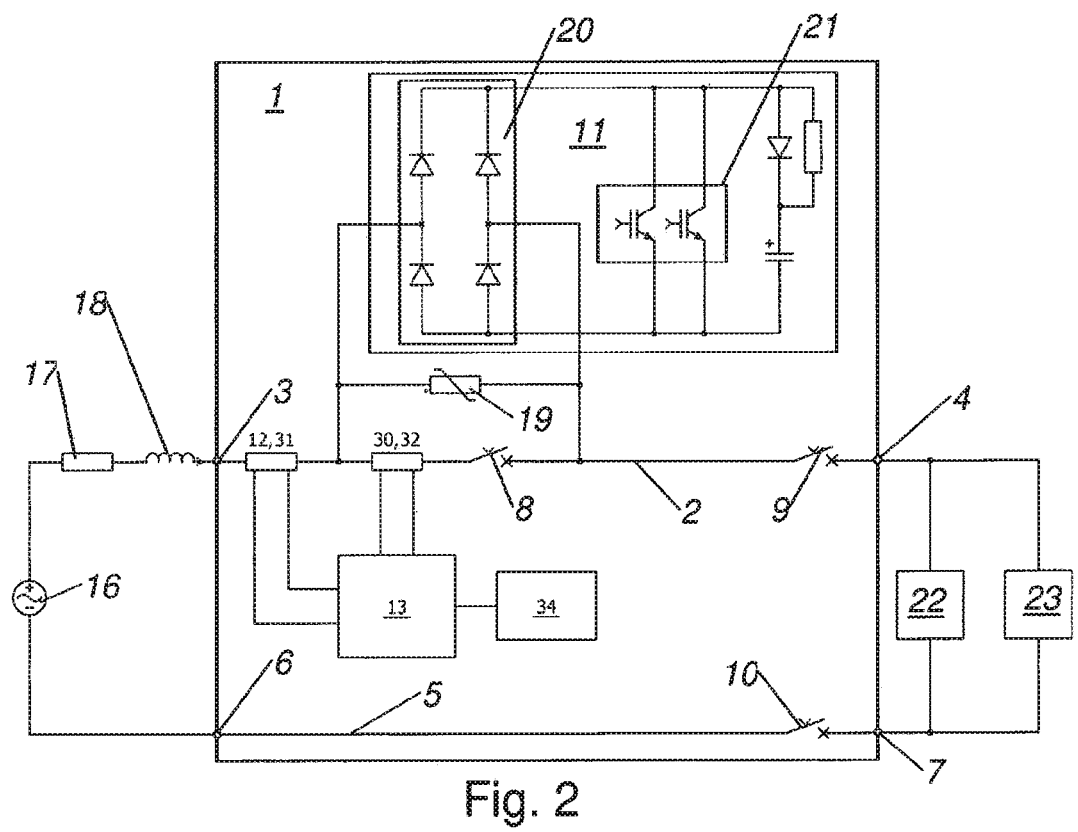
FIG. 2 depicts a low-voltage circuit breaker according to the first preferred embodiment of the present invention.
Figure 4:
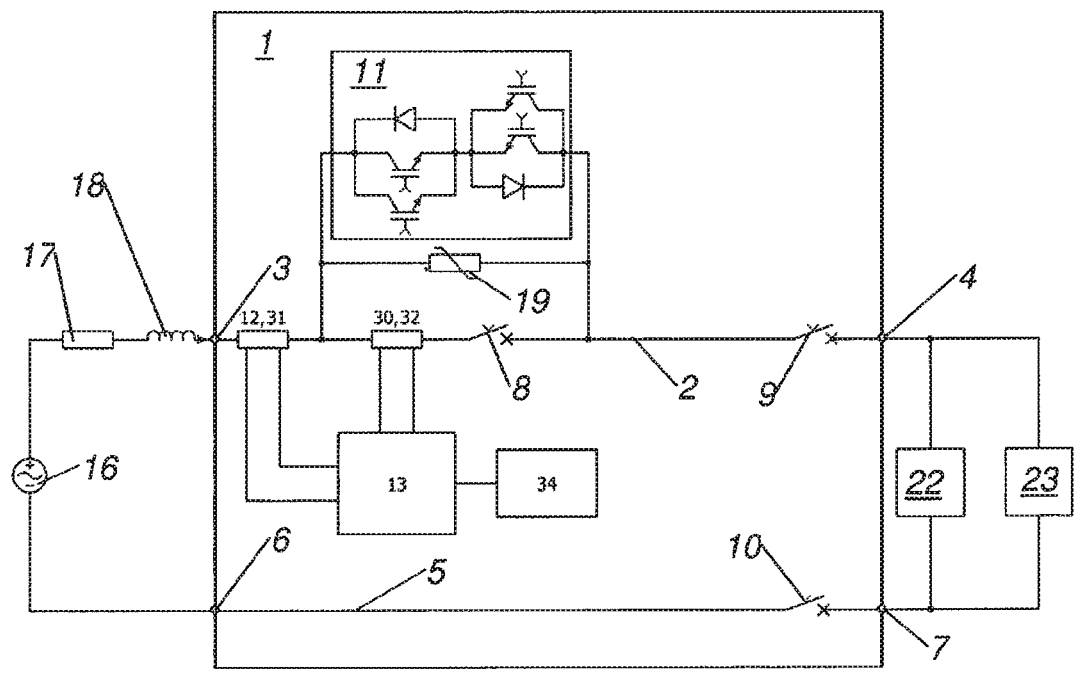
FIG. 4 depicts a low-voltage circuit breaker according to the second preferred embodiment of the present invention.

FIGS. 2 and 4 depict a low-voltage circuit breaker 1 having at least one external conductor section 2 from an external conductor power terminal 3 of low-voltage circuit breaker 1 to an external conductor load terminal 4 of low-voltage circuit breaker 1, and a neutral conductor section 5 from a neutral conductor terminal 6 of low-voltage circuit breaker 1 to a neutral conductor load terminal 7 of low-voltage circuit breaker 1, wherein a mechanical bypass switch 8 and a first mechanical disconnect switch 9 are arranged in series in external conductor section 2, wherein a second mechanical disconnect switch 10 is arranged in neutral conductor section 5, wherein a semiconductor circuit arrangement 11 of low-voltage circuit breaker 1 is switched in parallel to bypass switch 8, wherein there is arranged in external conductor section 2 a first current measuring arrangement 12, particularly comprising a first shunt 31, which is connected to an electronic control unit 13 of circuit breaker 1, wherein electronic control unit 13 is designed to actuate bypass switch 8, first mechanical disconnect switch 9, second mechanical disconnect switch 10 and semiconductor circuit arrangement 11 upon detecting a prespecifiable overcurrent, particularly a short circuit current, by means of current measuring arrangement 12, wherein low-voltage circuit breaker 1 has at least a second current measuring arrangement 30 for measuring a first current across bypass switch 8 or a second current across semiconductor circuit arrangement 11.

In this way, one can reliably detect that the contacts of bypass switch 8 actually open. After it has been detected in this way that the contacts of bypass switch 8 actually open, a counter 34 can be initiated, after whose process one can assume that the contacts in question are now completely or sufficiently open. Since it is now ensured that the opening of the contacts in question is in fact detected, subsequently started counter 34 can be set to a shorter time than has been the case to date. By means of the present measures, one can reliably detect that the contacts of bypass switch 8 have actually begun to open. In this way, a re-igniting of the electric arc can be avoided here. As a result, the short circuit can be deactivated in a shorter amount of time, by means of which in turn the load on IGBTs 21 and varistor 19 can be kept low. In this way, components can be used in respective cases, which have a lower load capacity as well as a smaller size. Due to the smaller size, the loop inductance is also decreased, by means of which the time can be decreased that the short circuit current requires to commutate to the IGBT parallel branch.

Present circuit breaker 1 as well as the circuit breaker according to WO 2015/028634 A1 involve low-voltage circuit breakers. Low voltage typically refers to a range of up to 1000V alternating current or 1500V direct current.

Figure 1:
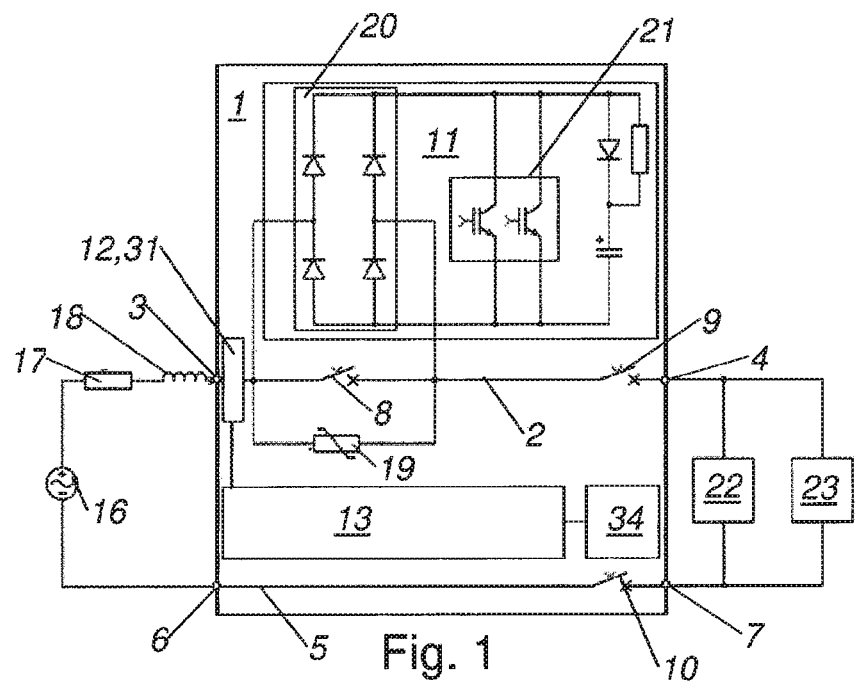
FIG. 1 depicts a circuit breaker according to prior art as a schematic diagram.

FIG. 1 depicts a circuit breaker according to prior art as described in WO 2015/028634 A1, for example. Like present circuit breaker 1, it also has an external conductor section 2 as well as a neutral conductor section 5. External conductor section 2 runs through circuit breaker 1 from an external conductor power terminal 3 to an external conductor load terminal 4. Neutral conductor section 5 runs through circuit breaker 1 from a neutral conductor terminal to a neutral conductor load terminal 7. Relevant terminals 3, 4, 6, 7 respectively are preferably designed as screw connection terminals or plug connection terminals, and arranged in circuit breaker 1 in an externally accessible manner.

Circuit breaker 1 preferably has an insulating housing.

A conventional mechanical bypass switch 8 having a single contact interrupter is arranged in external conductor section 2. Preferably and as depicted, a first mechanical disconnect switch 9 is also arranged, particularly in series to bypass switch 8, in external conductor section 2. Preferably, a second mechanical disconnect switch 10 is arranged in neutral conductor section 5. A semiconductor circuit arrangement 11 is switched in parallel to bypass switch 8.

Furthermore, an overvoltage arrester 19 is switched in parallel to bypass switch 8.

Circuit breaker 1 also has a current measuring arrangement 12, which is arranged in external conductor section 2, and which is preferably designed to comprise a first shunt 31 or shunt-resistor. First current measuring arrangement 12 is preferably arranged in series to both bypass switch 8 as well as semiconductor circuit arrangement 11. In a particularly preferred manner, it is provided that first shunt 31 is formed by a first conductor path section of a conductor path of low-voltage circuit breaker 1.

Current measuring arrangement 12 is connected to an electronic control unit 13 of circuit breaker 1, which is preferably designed to comprise a microcontroller or microprocessor. Electronic control unit 13 is designed to actuate bypass switch 8 and semiconductor circuit arrangement 11, as well as preferably first mechanical disconnect switch 9 and second mechanical disconnect switch 10, and thereby activate or switch these in a prespecifiable manner. To this end, electronic control unit 13 is connected preferably in a circuit-related manner to semiconductor circuit arrangement 11 as well as to actuating elements, particularly electromagnetic ones, of the mechanical switches, and thereby of bypass switch 8, of first mechanical disconnect switch 9 and of second mechanical disconnect switch 10. The corresponding connections originating from electronic control unit 13 are not depicted in FIGS. 1 and 2. When the power is turned off and after turning off IGBTs 21, the voltage will rise because of the energy stored in the network. The rising voltage is conducted by surge arrester 19, which limits the current. When the current is small enough, first and second mechanical disconnect switches 9, 10 are opened.

Semiconductor circuit arrangement 11 preferably has, as actual switch or regulating elements, a rectifier circuit 20, which is preferably designed as a full bridge, and in the present design two power semiconductors that are presently designed as IGBTs. A larger power semiconductor 21 may thereby also be provided.

FIG. 1 also indicates the electrical environment in addition to actual circuit breaker 1. The main supply is represented by the AC/DC network voltage source 16, network internal resistor 17 and network inductance 18. Furthermore, an electrical load 23 as well as an electrical fault 22 in the form of a short circuit are depicted.

In a switching device according to prior art, as shown in FIG. 1, it is provided that a deactivation process is executed by bypass switch 8 and semiconductor circuit arrangement 11, and first and second disconnect switches 9, 10 are only used to ensure a galvanic disconnect of the load circuit after deactivation has occurred.

In regard to a present low-voltage circuit breaker 1, as depicted in FIG. 2 as a preferred embodiment, it is provided that low-voltage circuit breaker 1 has at least a second current measuring arrangement 30 for measuring a first current across bypass switch 8 or a second current across semiconductor circuit arrangement 11. By measuring one of the currents in a branch of a representational parallel circuit, the current in the other branch of the parallel circuit is also known by applying Kirchhoff's First Law, if the total current through the parallel circuit is known.

Preferably, and as shown in FIG. 2, it is provided that second current measuring arrangement 30 is arranged, in terms of circuits, in external conductor section 2 in series to bypass switch 8 and in parallel to semiconductor circuit arrangement 11. In this way, the current is measured directly at bypass switch 8.

Figure 5:
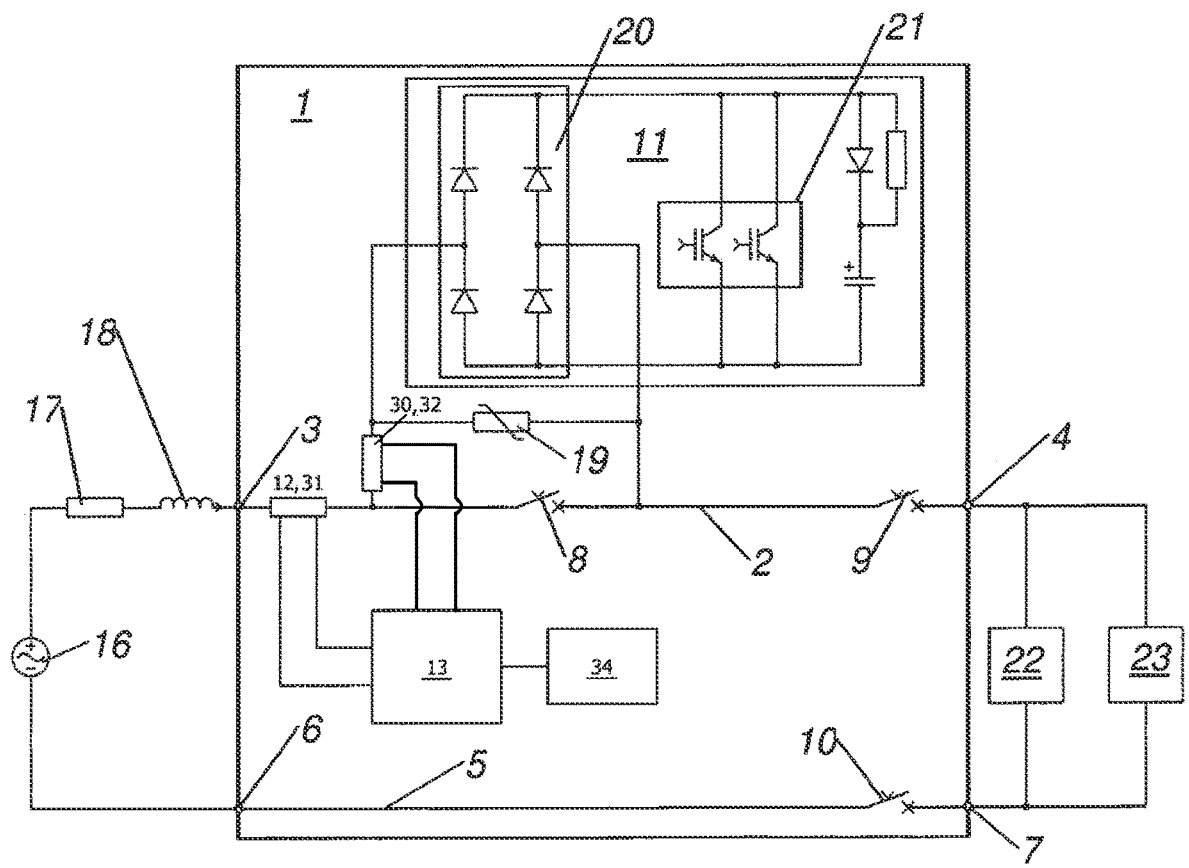
FIG. 5 depicts a low-voltage circuit breaker according to a third preferred embodiment of the present invention.

As shown in FIG. 5, additionally or alternatively, it may be provided that second current measuring arrangement 30 is arranged, in a circuit-related manner, in series to semiconductor arrangement 11 and in parallel to bypass switch 8.

Preferably, it is provided that second current measuring arrangement 30 comprises a second shunt. It has thereby proven itself to be particularly advantageous if second shunt 32 is formed by a second conductor path section. The resistance and thus also the power loss can thereby be kept low. Since the measurement results of second shunt 32 first become relevant at very high currents, the low voltage-drop on a conductive path section, like on the second conductive path section, results in sufficiently precise measurements.

In FIG. 2, only second shunt 32 is labeled as second current measuring arrangement 30. The current measurement by second current measuring arrangement 30 is thereby done through the interaction of second shunt 32 with electronic control unit 13.

Figure 3:
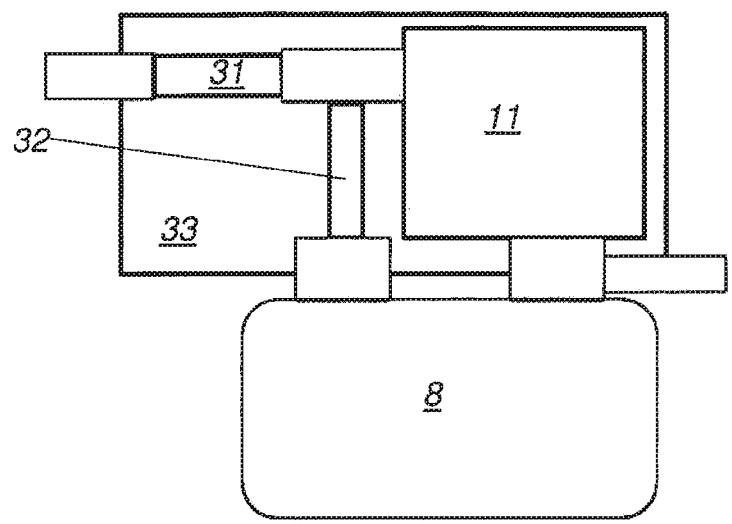
FIG. 3 depicts a component arrangement of a part of the present low-voltage circuit breaker.

It has proven to be particularly advantageous when second shunt 32 along with first shunt 31, as well as preferentially semiconductor circuit arrangement 11, are arranged on a substrate 33, particularly a DCB substrate. DCB stands for "direct copper bonded." FIG. 3 depicts a corresponding substrate 33 as well as a bypass switch 8 arranged on it. Through the arrangement on substrate 33, loop inductance can be further reduced, since the paths or loop length are kept short. Furthermore, the shutoff time of low-voltage circuit breaker 1 can thereby be reduced. In addition, the measurement accuracy is thereby enhanced since the two shunts 31, 32 are thermally coupled.

In regard to the arrangement of the first and second shunts 31, 32 on substrate 33, these are designed particularly as first or second conductor path sections.

FIG. 4 depicts a low-voltage circuit breaker according to the second preferred embodiment of the present invention. It is identical to the first preferred embodiment according to FIG. 2, down to the design of semiconductor circuit arrangement 11. The design of semiconductor circuit arrangement 11 using back-to-back IGBTs has multiple advantages. By means of the second current measuring arrangement 30, one can assess the bypass status, while one can simultaneously decrease the power loss as well as the component quantity, since a snubber is no longer required. In addition, the commutating loop can thereby be shortened.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A low-voltage circuit breaker, comprising:
   at least one external conductor section from an external conductor power terminal of the low-voltage circuit breaker to an external conductor load terminal of the low-voltage circuit breaker;
   a neutral conductor section from a neutral conductor terminal of the low-voltage circuit breaker to a neutral conductor load terminal of the low-voltage circuit breaker; and
   an electronic control unit,
   wherein a mechanical bypass switch arranged in the at least one external conductor section; wherein a semiconductor circuit arrangement of the low-voltage circuit breaker is switched in parallel to the mechanical bypass switch,
   wherein a first current measuring arrangement is arranged in the at least one external conductor section, the first current measuring arrangement comprising a first shunt, which is connected to the electronic control unit,
   wherein the electronic control unit is configured to actuate the mechanical bypass switch and the semiconductor circuit arrangement upon detecting a prespecifiable overcurrent comprising a short circuit current, by the first current measuring arrangement,
   wherein the low-voltage circuit breaker has at least a second current measuring arrangement configured to measure a first current across the mechanical bypass switch or a second current across the semiconductor circuit arrangement,
   wherein the second current measuring arrangement comprises a second shunt,
   wherein the second shunt along with the first shunt are arranged on a common substrate, and
   wherein, in a circuit-related manner, the second current measuring arrangement is arranged in series to the semiconductor circuit arrangement and in parallel to the mechanical bypass switch.

2. The low-voltage circuit breaker according to claim 1, wherein the first shunt is formed by a first conductor path section.

3. The low-voltage circuit breaker according to claim 1, wherein the second shunt is formed by a second conductor path section.

4. The low-voltage circuit breaker according to claim 1, wherein the common substrate is a direct copper bonded substrate.

5. The low-voltage circuit breaker according to claim 1, wherein the first current measuring arrangement is arranged in series to the mechanical bypass switch and in series to the semiconductor circuit arrangement.

6. The low-voltage circuit breaker according to claim 1, wherein in the at least one external conductor section, there is arranged, in series to the mechanical bypass switch, a first mechanical disconnect switch.

7. The low-voltage circuit breaker according to claim 6, wherein the electronic control unit is configured to actuate the first mechanical disconnect switch.

8. The low-voltage circuit breaker according to claim 1, wherein in the neutral conductor section, there is arranged a second mechanical disconnect switch.

9. The low-voltage circuit breaker according to claim 8, wherein the electronic control unit is configured to actuate the second mechanical disconnect switch.

10. The low-voltage circuit breaker according to claim 1, wherein the semiconductor circuit arrangement is arranged on the common substrate.

* * * * *